United States Patent
Gobell et al.

[11] Patent Number: 5,799,692
[45] Date of Patent: Sep. 1, 1998

[54] DEVICE FOR THE TRANSFER OF FLUID BETWEEN MACHINE COMPONENTS ROTATABLE RELATIVE TO EACH OTHER

[75] Inventors: Jürgen Gobell, Brechen; Stephan Ott, Wiesbaden; Michael Ueberle, Taunusstein, all of Germany

[73] Assignee: GAT Gesellschaft Fur Antriebstechnik mbH, Wiesbaden, Germany

[21] Appl. No.: 673,167

[22] Filed: Jun. 26, 1996

[30] Foreign Application Priority Data

Jul. 12, 1995 [DE] Germany .................. 195 25 343.4

[51] Int. Cl.⁶ .................................................... F16L 27/00
[52] U.S. Cl. ............................................................ 137/580
[58] Field of Search .............................................. 137/580

[56] References Cited

U.S. PATENT DOCUMENTS

| | | |
|---|---|---|
| 2,310,309 | 2/1943 | Orr ........................................ 137/580 |
| 2,485,692 | 10/1949 | Brill ...................................... 137/580 |
| 3,222,077 | 12/1965 | Snabes . |
| 3,292,937 | 12/1966 | Nunley . |
| 3,582,090 | 6/1971 | Lott . |
| 3,599,994 | 8/1971 | Komph, Sr. . |
| 4,664,145 | 5/1987 | Stich et al. ............................ 137/580 |
| 5,052,436 | 10/1991 | Bauch et al. ........................... 137/580 |
| 5,209,500 | 5/1993 | Sedy . |

FOREIGN PATENT DOCUMENTS

| | | |
|---|---|---|
| A 0 269 471 | 1/1988 | European Pat. Off. . |
| A 0 363 328 | 4/1990 | European Pat. Off. . |
| 1204772 | 1/1960 | France ................................... 137/580 |
| 575 808 | 4/1933 | Germany . |
| 28 49 256 | 5/1980 | Germany . |
| 32 23 703 A1 | 1/1984 | Germany . |
| 38 19 566 C2 | 5/1990 | Germany . |
| 780 945 | 8/1957 | United Kingdom . |
| 10 69 125 | 5/1967 | United Kingdom . |
| A 1 449 608 | 9/1976 | United Kingdom . |

*Primary Examiner*—A. Michael Chambers
*Attorney, Agent, or Firm*—Herbert Dubno

[57] ABSTRACT

A rotary fluid transmission between a pair of moving machine parts has frustoconical contact surfaces which are relatively rotatable and juxtaposed with one another and formed with openings or channels which communicate with one another. The contact between them can be direct or via sealing members for the openings or channels. The contact surfaces are provided so that they can axially separate at higher speeds and can contact each other at slower speeds or when the relative rotation terminates.

15 Claims, 2 Drawing Sheets

5,799,692

DEVICE FOR THE TRANSFER OF FLUID BETWEEN MACHINE COMPONENTS ROTATABLE RELATIVE TO EACH OTHER

SPECIFICATION

FIELD OF THE INVENTION

The present invention relates to a device for the transfer of fluid from a first machine component to a second machine component which is rotatable relative to the first machine component, wherein the first machine component comprises a first contact surface rotationally symmetrical about the axis of the relative rotation and the second machine component comprises a complementary second contact surface which is rotationally symmetrical on the same axis, and wherein transfer openings and/or channels are provided in the contact surfaces and machine components and the contact surfaces engage with each other either directly or through sealing elements situated between them.

BACKGROUND OF THE INVENTION

Such devices known as "rotary transmissions" for short, are relatively widespread in the prior art and are used to transfer fluid, e.g. lubricant, from one machine component to another machine component which is rotatable relative thereto. Usually so-called sliding sealing elements are use, i.e. the first and the second machine component comprise sliding sealing surfaces which are provided with openings that are at least from time to time aligned with each other to enable transfer of fluid between these openings. The contact surfaces around these openings engage with each other and thereby seal the openings to the exterior.

Such rotary transmissions with sliding sealing elements are known in the prior art in many variants and embodiments. Such sliding sealing elements may be provided on machine tools in which a fluid must be transferred from stationary to rotating machine components either for the cooling of the machined workpieces of or hydraulic actuation of machine elements. Development of machine tools has led to the tools and driving elements being designed for higher and higher velocities.

For a generally central supply of lubricant higher speed are mostly still without problems because such central supply may be achieved by means of contactless sealing (labyrinth sealing) or by slide sealing elements of small diameters. If, however, several separate fluid supplies are needed and switching over to injection into a central coolant supply and use of slide sealing elements of small diameter is no longer possible, slide sealing elements present problems because, from the high revolutions and large radii of corresponding sealing elements result very high relative velocities between the surfaces sliding on each other, so that a large amount of heat is produced which can no longer be reliably dissipated. This results in overheating of the sealing surfaces and in deterioration of their function or even seizure. This applies particularly to cases when through the supply means or rotary transmissions no or very little medium flows, which otherwise represents an important cooling factor.

OBJECT OF THE INVENTION

It is the object of the present invention to provide a device for the transfer of fluid between machine components according to the earlier mentioned features, which can ensure supply of a fluid when needed, without the danger of overheating at high speeds.

SUMMARY OF THE INVENTION

The object of the invention is achieved in that at least the regions of the first and second machine components which comprise the contact surfaces are displaceable relative to each other in axial direction such that the contact surfaces and/or sealing elements of the first machine component and those of the second machine component no longer contact each other but are at least axially displaceable and may be brought again in contact when no or only a slow relative rotation between the machine components takes place.

According to the present invention, at higher speeds the contact surfaces are simply moved from each other in axial direction so that they no longer glide on each other and no heat due to friction is therefore generated. It is possible, in many cases, to dispense with lasting contact of sealing surfaces of sliding sealing elements and to establish the contact only when no, or only slow, relative rotation takes place, e.g. when the supply of fluid serves for the hydraulic operation of clamping elements. Additionally, or alternatively, is naturally also possible to establish contact during very fast relative rotation, but only for a short period, so that the fluid may be supplied possibly in batches, while, due to the axial movability, the contact surfaces may be temporarily quickly moved out of contact to be sufficiently cooled.

The present invention is particularly useful for machines, devices or their components in which fluid must be supplied only while they are stationary, such as for devices for hydraulic clamping and releasing of tools of machine tools. Tools are changed only when the machine is stationary, so that in this state the contact surfaces are brought by axial movement to firm and tight contact with each other and then the hydraulic fluid or other fluid is transferred through openings in the contact surfaces from one machine component to the other so as to operate corresponding hydraulic elements or similar members. The contact surfaces are subsequently disengaged so that they are no longer in contact when fast relative rotation between the two machine components provided with the contact surfaces takes place.

This also reduces losses due to friction which the drive of the machine would have otherwise to overcome.

Preferably the contact surfaces are conical or have the shape of the curved surface of a frustum of a cone. Preferred are cone angles in the region of 30° to 90°, preferably about 45°. In general, contact surfaces which have radial components (i.e. are not cylindrical) are preferred, because these can be disengaged without friction by a relatively short axial movement. Compared to pure radial surfaces (surfaces perpendicular to the axis), conical surfaces have the advantage that they offer for a given outer diameter (and inner diameter) more space for the provision of bores, openings and/or grooves.

For proper functioning of the device it is also useful, when the relevant supply channels in the two machine components, which may extend in principle radially, axially or in peripheral direction, end in openings in the contact surfaces, wherein the openings in the contact surfaces of the first and the second machine component are situated in pairs at the same axial height. This ensures that the mutually associated openings in the contact surfaces may be brought at least partly into alignment with each other. Particularly preferred for this is further an embodiment of the invention in which at least one of the openings of one such pair of openings lies in the region of an annular groove extending around the relevant contact surface. This enables the two mutually associated openings to be brought to a state enabling flow through them, namely via a groove, when both the openings are, in circumferential direction, in different angular positions, so that when the machine stops, a particular angular position of the rotatable component relative to the stationary component need not be reached. This represents a particularly important advantage of this embodiment of the invention because many machine tools or similar machines which require such transfer arrangement, do not have devices for accurate setting of a particular angular position when a shaft or axis stops or such devices would have to be provided at considerable cost.

Depending on the purpose of the fluid supply, it may be useful if each of the contact surfaces comprises at least two mutually spaced-apart openings, so that through these two surfaces fluid may be separately supplied or removed. Between such a plurality of openings or also beyond an opening in one or the other direction is preferably provided a sealing which reliably seals outwardly the openings in the contact surfaces or their region of communication, at least in the state in which the two contact surfaces are closely engaged with each other. It is particularly useful for this purpose, if circumferentially extending grooves for the housing of sealing elements therein are provided, it being understood that the depth of the grooves is smaller than the thickness of a corresponding sealing ring, which therefore extends to some extent from the groove and may get into engagement with the opposite contact surface and the bottom of the relevant groove.

Also particularly preferred is an embodiment of the invention in which one of the contact surfaces is provided on an axially movable piston of one of the machine components, preferably a stationary machine component. As a consequence the whole machine component need not be moved, because it is sufficient if only the piston of one of the machine components is moved in axial direction to bring the two contact surfaces in mutual contact or separate them from each other.

The piston or the axially movable machine component should also be biassed in one direction, i.e. either in the direction of the contact or, preferably, against the direction of contact of the contact surfaces. The piston is preferably made in the form of an annular piston and surrounds a shaft or similar member of a rotatable machine component and its contact surface is a conical inner surface which may come into contact with a conical outer surface (curved surface of a frustum of a cone) and by axial movement of the piston is disengaged. The piston is on its outer surface shaped preferably as a substantially cylindrical stepped piston, wherein sealing elements are provided also on the outer surface of the piston in the cylindrical section in which the piston is guided for axial movement.

Finally those embodiments of the invention are preferred in which at least some of the inner channels or supply passages in the first or second machine component are provided with non-return valves which are preferably so arranged and designed that they prevent discharge of fluid in the region of the contact surfaces when the contact surfaces are disengaged.

BRIEF DESCRIPTION OF THE DRAWING

The above and other objects, features, and advantages will become more readily apparent from the following description, reference being made to the accompanying drawing in which.

SPECIFIC DESCRIPTION

The components, openings and channels shown in the Figures are not necessarily situated in the same axial plane; the individual elements may be displaced with respect to each other but here are projected on the same axial plane.

Figure 1:
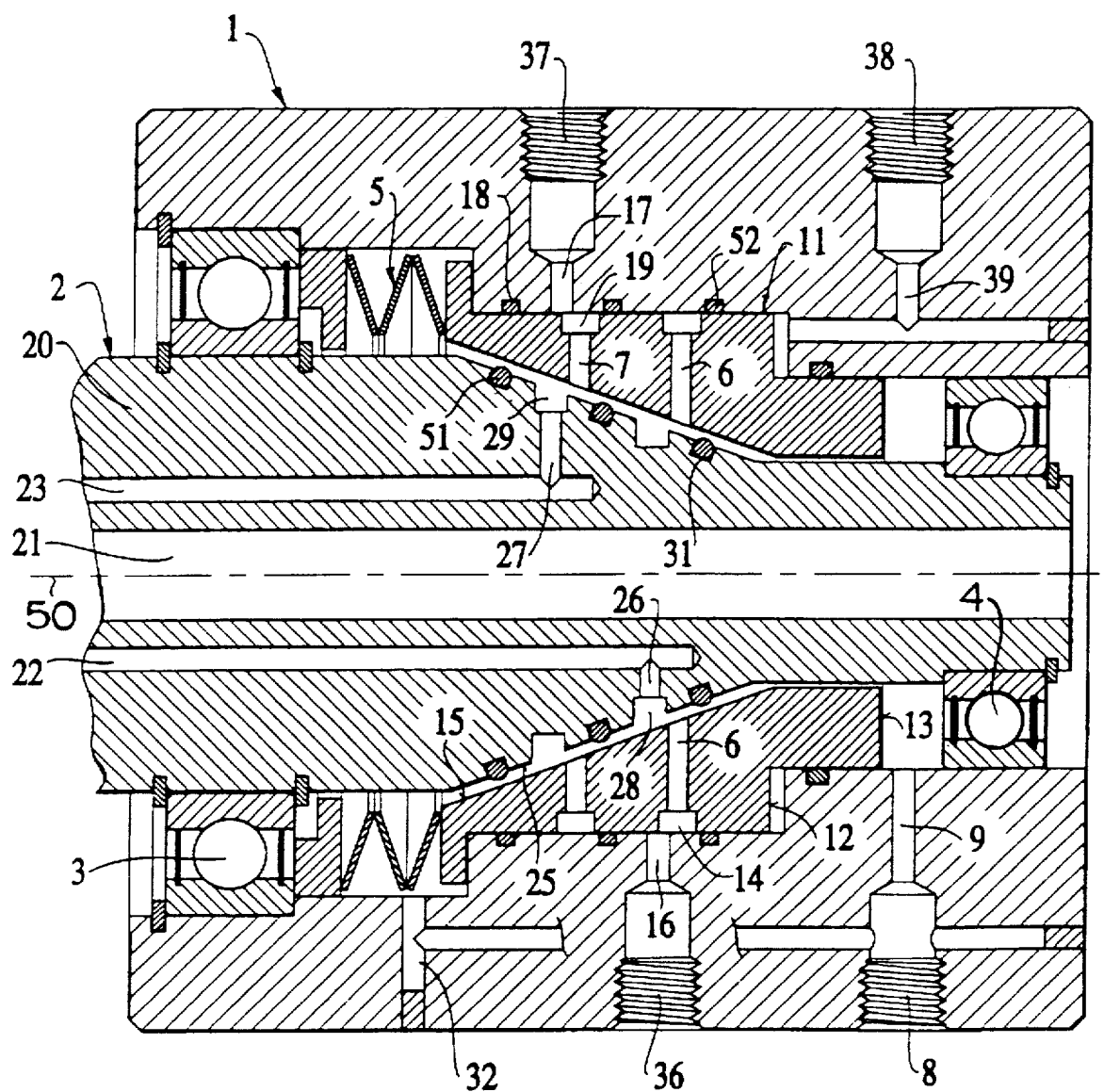
FIG. 1 is an axial longitudinal section of a device according to the invention in which the contact surfaces are not in contact.
Figure 2:
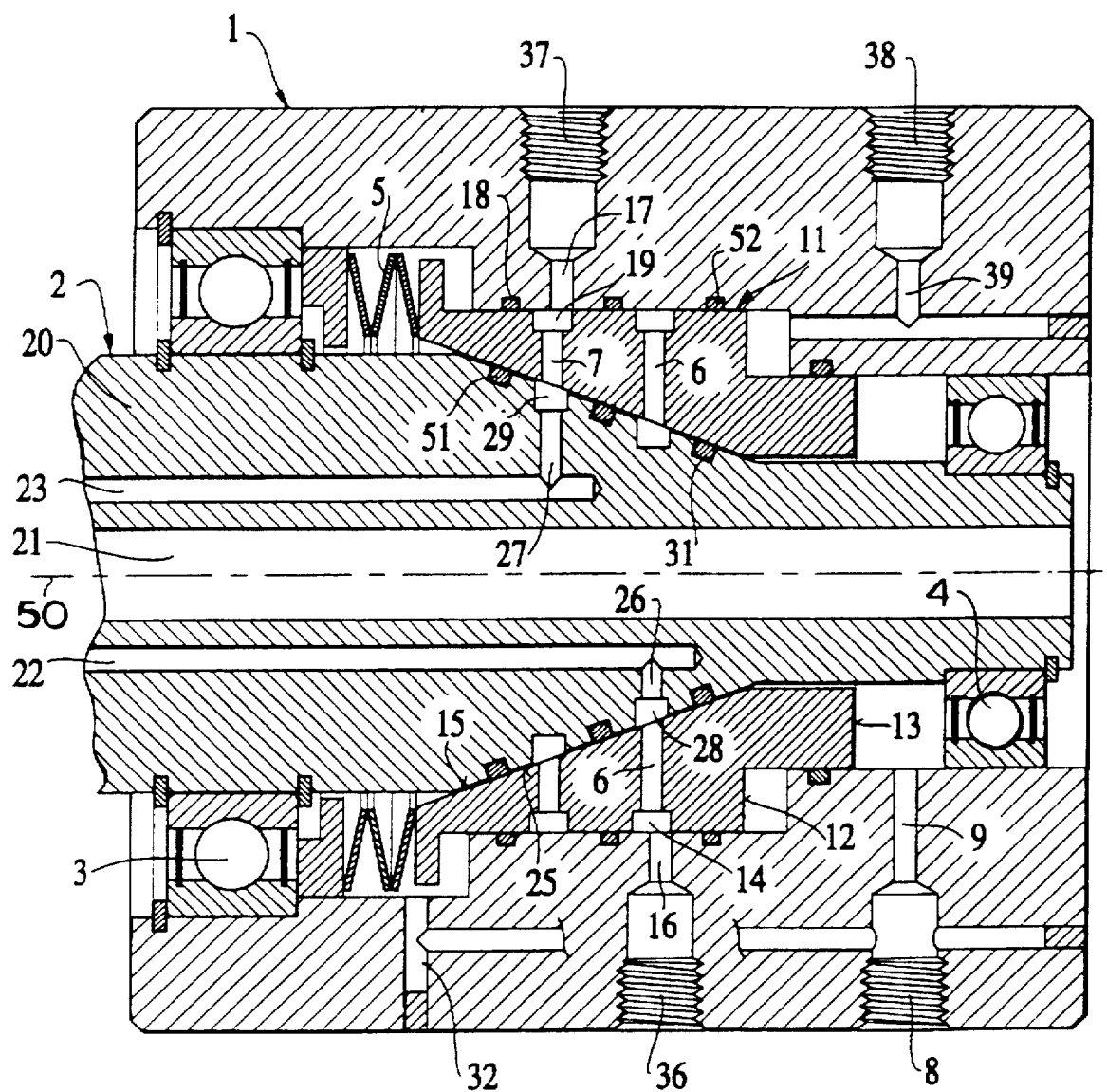
FIG. 2 is an axial longitudinal section the device according to FIG. 1 in a state in which the contact surfaces are in contact.

FIGS. 1 and 2 show a machine component 1 which should be here presumed, without any fundamental limitation, to be a stationary machine component. The component 1 is rotatable relative to a machine component 2 having a shaft 20 which is rotatable about a central axis 50 of rotation. The shaft 20 is, by means of antifriction bearings 3 and 4, mounted rotatably in the component 1. The shaft 20 has in the region which is on the left in the Figures a larger diameter than in the right-hand region, the transition being formed by a conical contact surface 25, which is juxtaposed with a complementary conical contact surface 15.

The surface 115 is formed on piston 11 which surrounds the shaft 20 in the manner of a ring and is outwardly guided in the component 1 in two cylindrical sections of different diameters. As is apparent, the stepped piston 11 is at its left-hand end pre-biassed by a spring 5 in axial direction to the right, so that the conical inner surface 15 of the piston 11 is not in engagement with the conical outer surface 25 of the shaft 20, as long as the force of the spring 5 acts on the piston 11. The shaft 20 is freely rotatable but not axially movable. In the illustrated embodiment the cone angle of the surfaces 15, 25 is about 40°.

The stepped piston 11 comprises radial bores 6 and 7, which are displaced with respect to each other at least in the axial direction, and, if desired, may be displaced relative to each other also in the circumferential direction. If desired, more bores 6 or 7 may be distributed on the periphery at the same axial height. Pressure may be admitted to the end face 12 of the stepped piston 11, which is visible in the Figure on the right, through the bore 39 and the outer connection 38, whereby the stepped piston 11 is pushed against the force of the spring 5 to the left in contact with the conical surface 25 of the shaft 20. In this position, which is not shown in the Figure, the through-flow holes 6, 7 in the stepped piston 11 are situated at the same axial height as the outer bores 16, 17 in the machine component 1 and also the inner bores 26, 27 in the shaft 20.

The bores 6, 7, 16, 17 and 26, 27 need not be, necessarily, aligned also in the peripheral direction, because the contact surface 25 has in the region of the bores 26, 27 a circumferential groove 28, 29 through which is established communication of the bore 6 or 7 even if the bores 26, 27 are displaced in peripheral direction relative to the bores 6, 7. Something similar applies also to the transition on the cylindrical outer surface of the piston 11 to the bores 16, 17 because also the piston 11 has on its outer surface in the region of the bores 6, 7 annular grooves 14, 19 which establish communication to the bores 16, 17.

The annular piston 11, which need not rotate relative to the rest of the machine component 1, could be, naturally, non-rotatably guided in the corresponding cylindrical sections of the machine component 1, so that the grooves 14, 19 on the outer side of the piston would not be needed to that extent as in the case of the contact surfaces between the stepped piston 11 and the shaft 20. Also in the case of the shaft 20 these grooves 28, 29 could be, naturally, dispensed with if the position of rotation of the shaft 20 could be exactly monitored and exactly set for stopping the machine.

Besides, it does not matter in principle on which of the surfaces which are always in contact with each other are provided corresponding grooves; they may be provided, in particular, also on the conical inner surface of the stepped piston 11 in the region of the bores 6, 7. In addition, further circular circumferential grooves 31 may be seen in the contact surface 25, which surround the grooves 28, 29 in axial direction. In these grooves 31 are situated sealing rings 51 which enter in contact with the opposite conical inner surface 15 of the stepped piston when the latter is moved to its position of maximum displacement to the left. This provides in front of and behind the openings 6, 7 or 26, 27 and the associated grooves 28, 29 circumferentially extending annular sealing elements which causes that the fluid supplied through the openings 16, 6, 26 or 17, 7, 27 cannot escape between the contact surfaces 15, 25.

If the surfaces are made and shaped sufficiently accurately, the grooves 31 and the sealing rings situated therein may even be dispensed with and instead the conical surfaces 15, 25 may be in direct contact with each other.

As is apparent from the Figure, grooves 18 for sealing rings 52 are provided on the outer surface of the piston, always axially in front of and behind the bores 6, 7; the sealing rings preventing leakage also on the outer side of the piston 11. The bores 8, 9 and 32 serve for the return of leaked fluid.

As has already been mentioned, the individual bores and through-flow passages are not necessarily situated in the same axial plane, so that the bores 26, 27 do not open into the same axially parallel inlet 22; on the contrary, inlets 22, 23 are displaced in circumferential direction (here shown displaced through 180°) and extend parallel to each other, while e.g. the bore 26 or the bores 26 communicate only with the inlet 22 and the bore or bores 27 only with the inlet 23, and also several inlets 22, 23 may be provided in parallel.

In addition a central fluid inlet bore 21, through which may be supplied e.g. a coolant, can be seen in the centre of the shaft 20.

It is particularly useful, although not specifically shown, if valves, particularly non-return valves, are provided either in the connection openings 8, 36, 37 and 38 or in the inlets and bores 9, 16, 17, 19, 22, 23, which block the outflow of fluid when the piston is displaced to the right to the position in which it is no longer in contact with the conical surface 25 of the shaft 20. Such non-return valves may serve also to save some external openings for the supply of fluid, such as the bore 38, in that corresponding passages or bores, e.g. 6 and 39, communicate with each other through a non-return valve.

It can also be useful when the displacement path of the piston 11 is so long that the communication to the bores 9, 16, 17 is thereby interrupted. It is understood that the clear distance between the grooves 18 is always greater than the maximum path of motion of the stepped piston 11.

While in the representation in FIG. 1 the movable piston 11 is displaced by the action of the spring 5 to its right-hand end position and the contact surfaces 15 and 25 therefore do not contact each other, FIG. 2 shows the state in which the piston is displaced against the force of the spring 5 to the left to the contact position. In this position the contact surfaces 15, 25 are in mutual contact and the sealing rings 51 bear firmly on to the sealing surfaces of the contact surface 25 situated opposite so that they seal. The force needed for the displacement of the piston 11 against the action of the spring 5 is exerted by the pressure of a fluid acting on the end face 12 of the piston 11.

As is apparent from FIG. 2, the bores and grooves 37, 17, 19, 7, 29 and 27 are situated in this contact state at the same of mutually overlapping axial height so that a continuous fluid communication is established between the bore 37 and the inner bore 23 in the rotatable machine component 2, which may thus be supplied with the desired fluid. Also provided are bores and grooves 36, 16, 14, 6, 28 and 26, which are shown in FIG. 2 opposite each other, which also overlap each other axially or are positioned at the same axial height, and which supply a second, axially parallel bore 22 of the rotatable machine component 2 with a fluid.

We claim:

1. A device for the transfer of fluid from a first machine component to a second machine component which is rotatable relative to said first machine component, wherein said first machine component comprises a first contact surface rotationally symmetrical about an axis of the relative rotation and said second machine component comprises a complementary second contact surface which is rotationally symmetrical about said axis, and wherein transfer openings or channels are provided in said contact surfaces and machine components, wherein, in order to transfer a fluid from one of said first and second machine components to the other of said first and second machine components the contact surfaces engage with each other said contact surfaces being conical surfaces at least portions of the first and second machine components comprising said contact surfaces being displaceable axially relative to each other in a first axial direction at least by an amount so that the contact surfaces no longer contact each other, but are brought into contact again by an axial displacement along the opposite direction at least in a situation when at most a slow relative rotation between said machine component occurs said device further comprising means for effecting said relative axial displacement of said contact surfaces.

2. The device defined in claim 1 wherein said contact surfaces engage each other directly.

3. The device defined in claim 1 wherein said contact surfaces engage each other through sealing elements situated therebetween.

4. The device defined in claim 1 wherein said contact surfaces have a conical angle between 30° and 90°.

5. The device defined in claim 4 wherein said angle is about 45°.

6. The device defined in claim 4 wherein each of said contact surfaces has openings communicating with openings of the other contact surface at the same axial level.

7. The device as defined in claim 6 wherein openings of at least one of said contact surfaces communicate with circumferential grooves at the same axial level as openings of the other contact surfaces.

8. The device as defined in claim 6 wherein at least one of said contact surfaces has at least two of said openings.

9. The device as defined in claim 6 wherein circumferential sealing rings are recessed in grooves of at least one of said contact surfaces flanking an opening thereof.

10. The device as defined in claim 9 wherein openings in said one of said contact surfaces are separated by said sealing rings.

11. The device as defined in claim 1 wherein one of said components is an axially movable piston under a spring bias urging said contact surfaces axially relatively apart.

12. The device as defined in claim 11 wherein said piston has an inner one of said contact surfaces and the other of said components in part surrounds said piston.

13. The device as defined in claim 11, further comprising sealing rings on an exterior of said piston.

14. The device as defined in claim 11 wherein said piston is a stepped piston with two cylindrical portions of different diameters.

15. The device as defined in claim 1 wherein at least some of said openings in said contact surfaces are provided with non return valves separating said openings from respective supply passages when said contact surfaces are out of contact.

* * * * *